United States Patent
Roberson et al.

(10) Patent No.: US 9,304,847 B2
(45) Date of Patent: Apr. 5, 2016

(54) AUTOMATIC PROMPT DETECTION FOR UNIVERSAL DEVICE SUPPORT

(71) Applicant: RIVERBED TECHNOLOGY, INC., San Francisco, CA (US)

(72) Inventors: James Roberson, Apex, NC (US); Krishnan Sivaramakrishna Iyer, Cary, NC (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 162 days.

(21) Appl. No.: 14/267,349

(22) Filed: May 1, 2014

(65) Prior Publication Data

US 2014/0331093 A1  Nov. 6, 2014

Related U.S. Application Data

(60) Provisional application No. 61/818,951, filed on May 3, 2013.

(51) Int. Cl.
| | |
|---|---|
| *G06F 11/00* | (2006.01) |
| *G06F 11/07* | (2006.01) |
| *H04L 12/24* | (2006.01) |
| *G06F 11/22* | (2006.01) |
| *G06F 11/263* | (2006.01) |
| *G06F 9/455* | (2006.01) |

(52) U.S. Cl.
CPC ........ *G06F 11/0787* (2013.01); *G06F 11/2252* (2013.01); *G06F 11/263* (2013.01); *H04L 41/06* (2013.01); *H04L 41/0876* (2013.01); *G06F 9/45512* (2013.01); *H04L 41/0213* (2013.01)

(58) Field of Classification Search
None
See application file for complete search history.

(56) References Cited

U.S. PATENT DOCUMENTS

| 6,073,164 | A | * | 6/2000 | Zey | ............... | H04L 41/22 370/218 |
|---|---|---|---|---|---|---|
| 7,627,833 | B2 | * | 12/2009 | McKnight | ......... | G06F 9/45512 715/780 |
| 2004/0179683 | A1 | * | 9/2004 | von Behren | ......... | G06F 21/53 380/44 |
| 2004/0199922 | A1 | * | 10/2004 | Krutsch | ......... | G06F 17/30557 719/310 |
| 2007/0056031 | A1 | * | 3/2007 | Sivaramakrishna Iyer | ......... | H04L 12/24 726/12 |
| 2012/0151563 | A1 | * | 6/2012 | Bolik | ............... | H04L 9/0891 726/6 |
| 2013/0019154 | A1 | * | 1/2013 | Wolfston, Jr. | ......... | G06Q 10/00 715/221 |

(Continued)

FOREIGN PATENT DOCUMENTS

JP     02030245  A  *  1/1990  ............ H04L 9/32

*Primary Examiner* — Gabriel Chu
(74) *Attorney, Agent, or Firm* — Park, Vaughan, Fleming & Dowler LLP; Laxman Sahasrabuddhe

(57) ABSTRACT

Embodiments provide systems, methods, and computer program products for network management application to automatically determine a session prompt for a network device and perform error handling. After logging in to a network device, the network management application records the first session prompt response. The network management application sends a series of empty carriage returns and random characters and records the session prompt responses. The network management application compares the responses and determines whether the prompt is a static or a dynamic prompt based on the results. The network management application elicits error responses from the network device by sending additional random characters and records the results in an error handling dictionary. The error handling dictionary is used later when running user-provided commands, enabling a determination of whether a command executed successfully.

20 Claims, 11 Drawing Sheets

(56) References Cited

U.S. PATENT DOCUMENTS

2013/0019155 A1* 1/2013 Wolfston, Jr. .......... G06Q 30/02
715/221

2014/0331093 A1* 11/2014 Roberson ............ G06F 11/0787
714/48

* cited by examiner

300

302

304 { login: kiyer
password:

306 *CARY-EX-ACC01:1 #
308 *CARY-EX-ACC01:1 #

Syntax error at token .

Available commands:

310     <cr> clear configure create delete disable download enable exit history logout mplsping mplstrace mrinfo mtrace nslookup ping quit reboot restart rtlookup run save show telnet traceroute unconfigure upload use vplsping vplstrace xping

312 *CARY-EX-ACC01:2 #

FIG. 3

AUTOMATIC PROMPT DETECTION FOR UNIVERSAL DEVICE SUPPORT

CROSS-REFERENCE TO RELATED APPLICATIONS

The present application claims the benefit of U.S. Provisional Patent Application No. 61/818,951, filed on May 3, 2013, which is incorporated herein by reference in its entirety.

BACKGROUND

1. Technical Field

The present disclosure relates generally to network management, and particularly to automatically determining a device prompt for an unknown network device for recognizing when the network device is ready to receive input commands.

2. Background Art

Networks are composed of a combination of routers, switches, firewalls, load balancers, WAN accelerators, and other networking devices. Network management includes accessing some or all of these network devices in order to determine their configuration, modify their configuration, obtain diagnostic information, and monitor performance. These devices are primarily configured, managed and maintained by network administrators through a command line interface (CLI). When network management applications attempt to interact with the CLI of a network device, the network management applications also need to know when the CLI is ready to receive input commands. Because network management applications have no visual processing equal to that of the administrator, there is no clear way of understanding when the network device is ready to receive input commands.

Further, the ability to log into remote network devices and identify when the CLI is ready to receive input commands is a difficult problem because these network devices are manufactured by a variety of vendors operating under a variety of locales. Determining whether the CLI is ready requires the network management application to detect an almost infinite number of prompts. These prompts can range from special characters to any combination of letters and other language-based characters. Programming a network management application to detect and respond to each prompt among a vast and dynamic set of prompts would require continuous maintenance, including excessive research and development hours and cost.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

FIG. 3 illustrates an exemplary dynamic prompt of a CLI for a network device according to an embodiment.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

Example Network Environment

Figure 1:
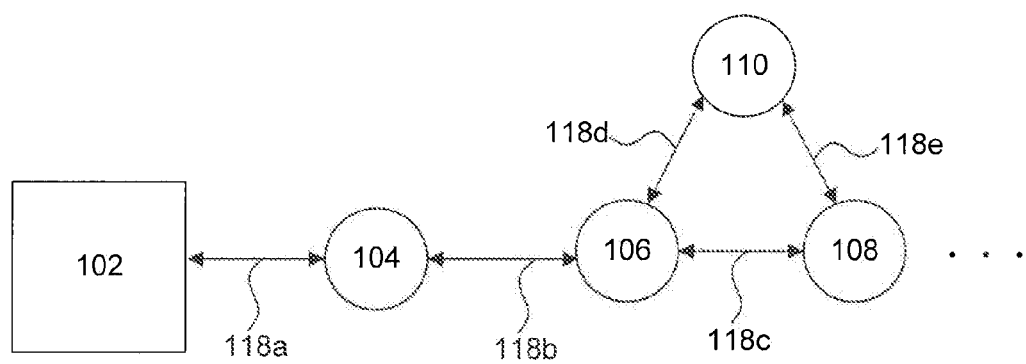
FIG. 1 illustrates an exemplary network environment according to an embodiment.

FIG. 1 illustrates an example network environment 100 according to an embodiment of the present disclosure. Example network environment 100 is provided for the purpose of illustration and is not limiting of embodiments of the present disclosure. As shown in FIG. 1, example network environment 100 includes computing device 102 and a plurality of network nodes 104, 106, 108, and 110. A "node" may refer to layer 3 devices such as Layer-3 (L-3) routers or switches. In some embodiments, "node" may also refer to other types of network elements including switches, bridges, firewalls, load balancers, virtual routers, servers, terminals, hosts, etc. As would be understood by a person skilled in the relevant art(s) based on the teachings herein, example network environment 100 may include more or fewer network nodes and/or elements than shown in FIG. 1.

As will be discussed in more detail with respect to the various embodiments and figures below, embodiments of the present disclosure enable a network management application, for example implemented by computing device 102, to automatically access the network nodes 104-110 and determine the prompt of a CLI without user intervention as well as generate and use an error handling dictionary.

In an embodiment, computing device 102 is a host device which is in communication with the network nodes 104-110. Communication between two host devices, for example including host device 102 and another host device at the other end of the network (not shown) may be enabled by nodes 104-110. In an embodiment, a communication path among the computing device 102 and the network nodes 104-110 includes a plurality of links 118a-e as shown in FIG. 1. Each link 118a-e may include one or more data links and may include further network nodes. The links 118a-e may be, for example, coaxial and/or fiber optic, to name just a few examples, of a physical layer network. The physical layer network may be, for example, Synchronous Optical Networking (SONET)/Synchronous Digital Hierarchy (SDH), Ethernet, Optical Transport Network (OTN), Wavelength Division Multiplexing (WDM), and Digital Subscriber Line (DSL). These are by way of example only; other physical layer (Layer-1 or "L-1") networks are also within the scope of the present application, as would be understood by a person skilled in the relevant art(s).

In the example of FIG. 1, nodes 104-110 may be L-3 devices and/or Layer-2 (L-2) devices (e.g., switches or bridges that can be configured to receive packets or frames on one port (or interface) and selectively forward the packets or frames onto another port), although other combinations are possible as will be recognized by those skilled in the relevant art(s).

A network management application, for example implemented by computing device 102, may have control of a local area network that includes computing device 102 and nodes 104-110. As will be recognized by those skilled in the relevant art(s), control may be over more or fewer than just nodes 104-110. As used herein, "network administrator" refers to any entity, such as a person or program, that can access, modify, or replace configuration files for a given node and perform other control functions with respect to a computer network. A "network management application" is an example of a "network administrator" program entity.

Commands sent by a network administrator are similar to conversations, which have a beginning and an end—the network administrator sends a command, the network device sends the response to the interface, such as a display, and the conversation ends when the network device has stopped sending output data. Visually, the appearance of a session prompt at the CLI indicates that the conversation has ended and that the network device is ready to receive additional commands. While network administrator persons who log into network devices may rely on visual sight to recognize when the network device is ready to receive input commands at the CLI, the network management application does not rely on the same kind of visual processing.

Figure 2:
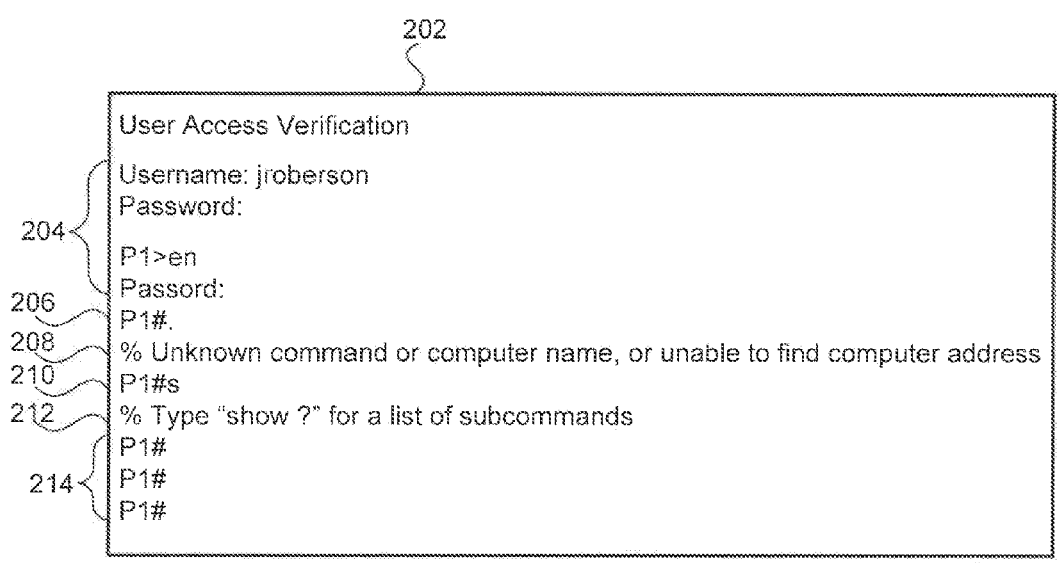
FIG. 2 illustrates an exemplary static prompt of a command line interface (CLI) for a network device according to an embodiment.

Session prompts may be static or dynamic, as demonstrated in FIGS. 2 and 3. FIG. 2 illustrates an example of a static prompt 200 for a network device according to an embodiment. The static prompt 200 includes CLI 202. Lines 204 demonstrate the act of entering a username and password to log into a network device, such as any of nodes 104-110 of FIG. 1. There are several different approaches for logging into network devices. For example, an approach for automatically logging into network devices, such as by a network management application, is described in U.S. Pat. No. 8,230,491, which is incorporated herein by reference in its entirety.

After successfully logging in at the authentication prompt lines 204, the

CLI 202 displays the first session prompt 206. In FIG. 2, the first session prompt 206 is P1#. As indicated above, network devices may be manufactured by a variety of vendors operating under a variety of locales, and each vendor may provide different prompts ranging from special characters to any combination of letters and other language-based characters. In an embodiment, the characters may be based on any one or more of several languages. The static prompt 200 of FIG. 2 is just one example from a variety of vendor-determined static prompts, as will be recognized by those skilled in the relevant art(s).

In the exemplary CLI 202, the period character (".") is entered at the first session prompt 206, followed by a carriage return (e.g., "enter"). In response, the network device outputs to the CLI 202 error message 208, indicating that the character entered at the first session prompt 206 was not a valid command.

After the error message 208, the network device outputs to the CLI 202 a second session prompt 210, after which the character "s" is entered at the second session prompt 210 followed by a carriage return. In response, the network device outputs to the CLI 202 another error message 212. Although the error message 212 is different from the error message 208, both serve to indicate that the character entered at the respective session prompt was not a valid command.

The network device then outputs to the CLI 202 session prompts 214. At the first of the session prompts 214, a carriage return is entered which results in the next of the session prompts 214. Each time a carriage return is entered, the network device outputs to the CLI 202 another session prompt. As can be seen from FIG. 2, after each carriage return and/or invalid character, the session prompts 206, 210, and 214 are the same. The session prompts in static prompts do not change, regardless of what commands are issued to the network device FIG. 3 illustrates an example of a dynamic prompt 300 for a network device according to an embodiment. The dynamic prompt 300 includes CLI 302. Lines 304 demonstrate the act of entering a username and password to log into a network device, such as any of nodes 104-110 of FIG. 1, for example as discussed above with respect to FIG. 2.

After successfully logging in at the authentication prompt lines 304, the CLI 302 displays the first session prompt 306. In FIG. 3, the first session prompt 306 is *CARY-EX-ACC01: 1#. This dynamic prompt 300 is just one example from a variety of vendor-determined dynamic prompts, as will be recognized by those skilled in the relevant art(s).

In the exemplary CLI 302, the carriage return is entered at the first session prompt 306. In response, the network device outputs to the CLI 302 the second session prompt 308. After the second session prompt 308 is displayed, the period character "." is entered, followed by a carriage return. In response, the network device outputs to the CLI 302 error message 310, indicating that the character entered at the second session prompt 308 was not a valid command.

Once the error message 310 has been displayed, the network device outputs to the CLI 302 the third session prompt 312. In FIG. 3, the third session prompt 312 is *CARY-EX-ACC01:2#. The third session prompt 312 is different when compared against the first session prompt 306 and the second session prompt 308. This demonstrates the nature of dynamic session prompts, which change after each command that is issued to the network device. In the example of FIG. 3, the last number of the session prompt, which incremented to 2 in the third session prompt 312, may increment with each successive command, for example by 1 every time. As will be recognized by those skilled in the relevant art(s), the session prompt may be incremented by a different value or by a different character change pattern.

In FIG. 3, there is no difference between first and second session prompts 306 and 308 because a command was not sent to the network device, but rather only a carriage return which is not recognized as a command by the network device. Alternatively, a dynamic prompt may also change the session prompt after each carriage return as well, in addition to the change after each command.

Figure 4:
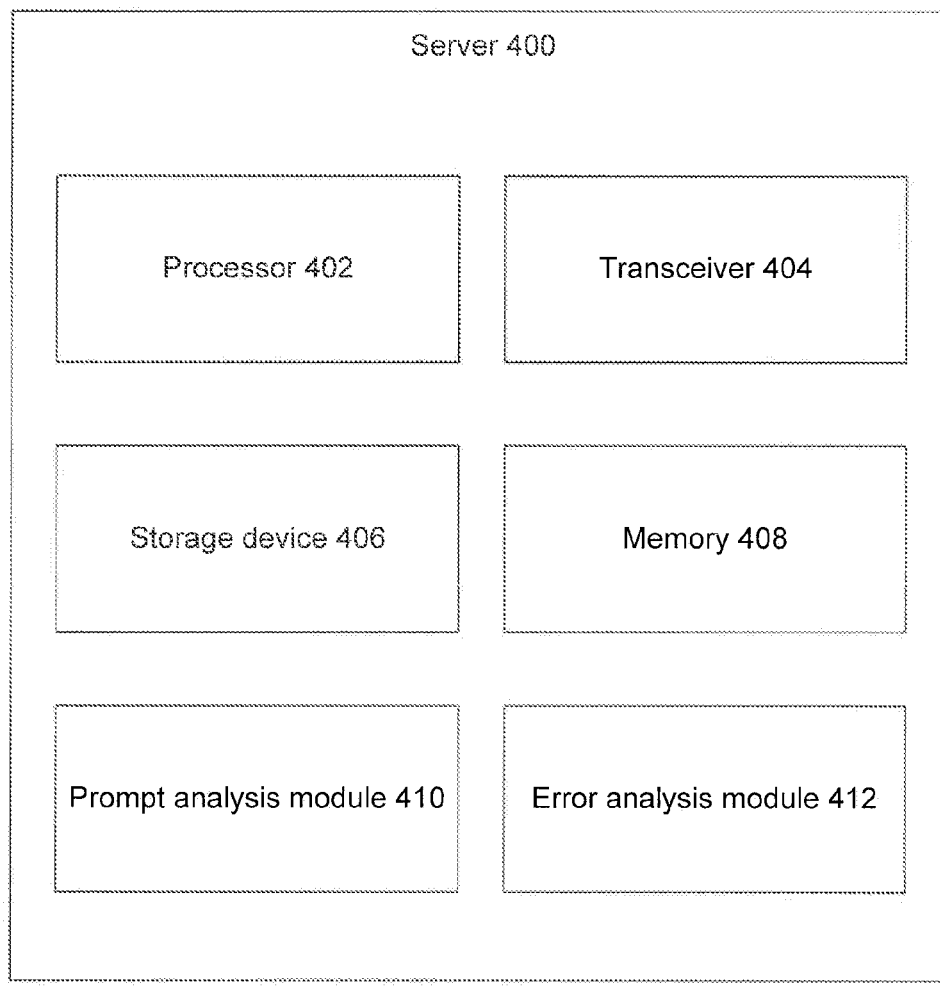
FIG. 4 illustrates an exemplary server apparatus according to an embodiment.

FIG. 4 illustrates an exemplary server 400 according to an embodiment.

The server 400 may be used, for example, to host a network management application to access one or more of the network devices 104-110. Although described as a server, those skilled in the relevant art(s) will recognize that other computing devices may also be used to access one or more network devices. The server 400 may include one or more processors 402. The one or more processors 402 may each include one or more processing cores, capable of performing parallel or sequential operations. Server 400 may also include a transceiver 404, for example an Ethernet connection, WiFi connection, or other connection capable of enabling the server 400 to transmit and receive data to/from external sources. The server 400 may include a storage device 406, for example a hard drive, flash drive, or other types of long-term storage as will be understood by persons skilled in the relevant art(s). The server may also include memory 408, such as random access memory (RAM).

When the server 400 operates to access and manage one or more network devices, the server 400 may determine a type of session prompt of the network device's CLI (e.g., either static or dynamic) and derive a regular expression using prompt analysis module 410. As used herein, a "regular expression" refers to all of the characters of the derived session prompt that the prompt analysis module 410 has determined does not change between session prompts. In an embodiment, the prompt analysis module 410 may send carriage returns and commands to the network device and record the responses. The prompt analysis module 410 may compare the responses to each carriage return and/or command. Based on the results of the comparisons, the prompt analysis module 410 may determine that the session prompt is a static prompt (the change between carriage returns and between commands is zero) or a dynamic prompt (there is some change between prompts in response to commands and/or carriage returns). The prompt analysis module 410 may then derive a regular expression by determining what characters remain the same in each session prompt.

The server 400 may construct an error handling dictionary using error analysis module 412. In an embodiment, the error analysis module 412 may operate after the prompt analysis module 410 has completed operation, such as by deriving a regular expression. The error analysis module 412 may send one or more special characters that likely have no meaning to the network device, in order to elicit one or more error responses from the network device. The error analysis module 412 may record the error responses and construct an error handling dictionary, such as in a database. The error handling dictionary may then be referenced when sending desired commands to the network device to better understand the network device's behavior, such as to assist in determining whether the data returning from the network device is likely meaningful data or not, or whether the command executed successfully or not.

Figure 11:
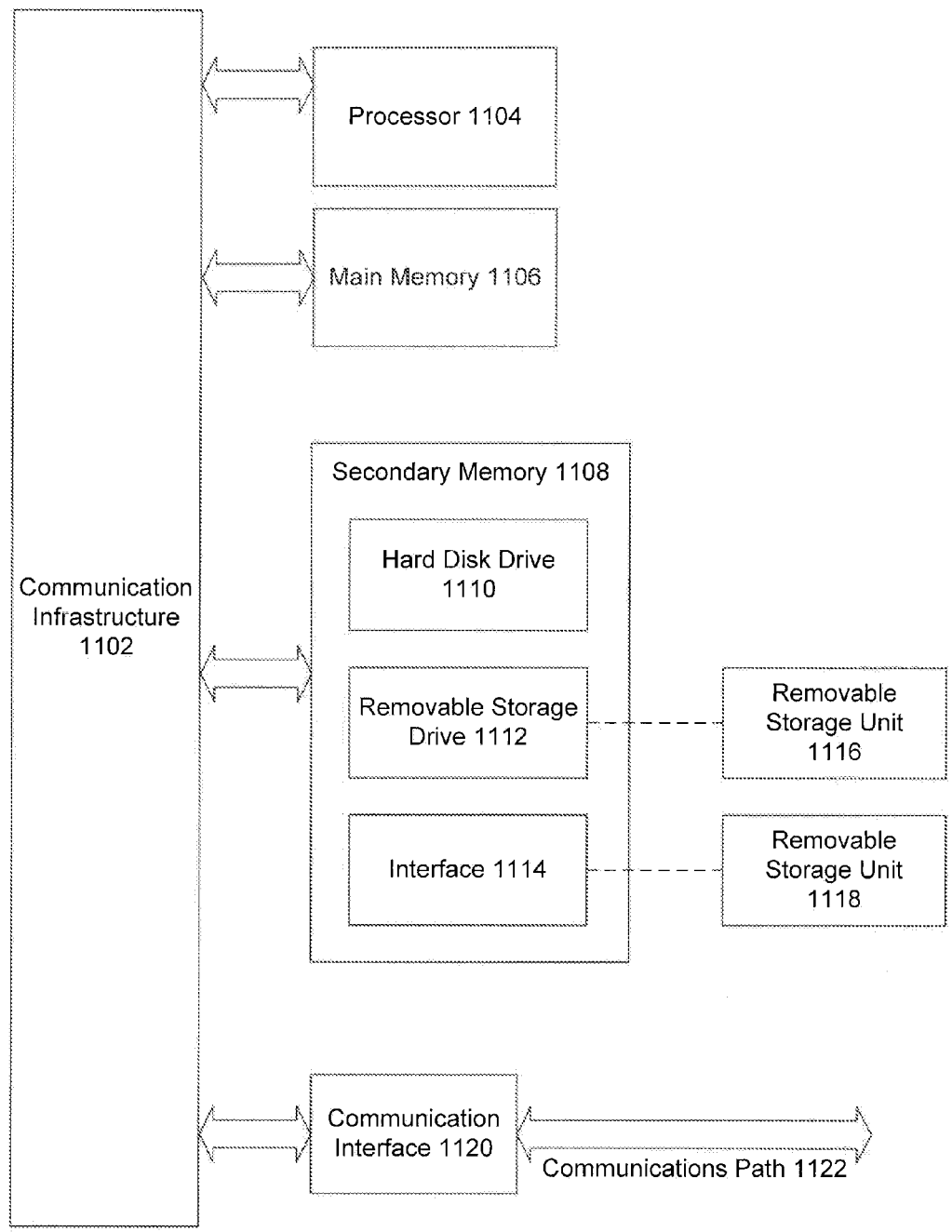
FIG. 11 illustrates an exemplary computer system that can be used to implement aspects of embodiments.

An exemplary embodiment of server 400 will be discussed in further detail below with respect to FIG. 11. As will be recognized by those skilled in the relevant art(s), the different functions of server 400 depicted in FIG. 4 may be performed within the server 400, or alternatively may be performed by a plurality of different servers or other types of computing devices operating in cooperation within a geographic vicinity of each other or at geographically different locations.

Figure 5:
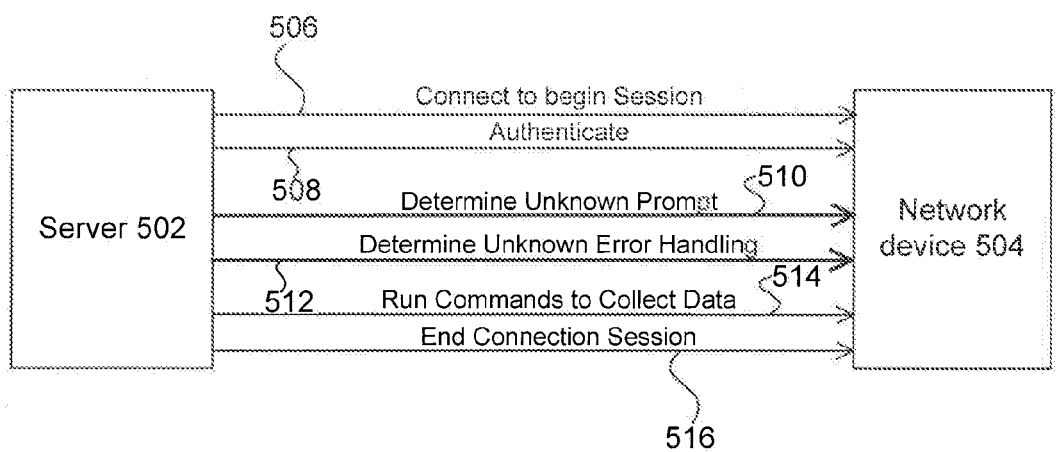
FIG. 5 illustrates an exemplary network management session between a server apparatus and a network device according to an embodiment.

FIG. 5 illustrates an exemplary network management session 500 between a server 502 and a network device 504 according to an embodiment. Server 502 may be an example of computing device 102 in FIG. 1 or server 400 in FIG. 4, and network device 504 may be an example of one or more of nodes 104-110 of FIG. 1. Although the following references to a single network device 504 for simplicity of discussion, it will be understood that the server 502 similarly may access multiple network devices, such as nodes 104-110 discussed above with respect to FIG. 1, which may represent any number of network devices ranging from a few to thousands or more.

The server 502 establishes a connection 506 with the network device 504 to begin a session. In an embodiment, the connection may be a TELNET or a secure shell (SSH) connection, to name just a few examples. In an embodiment, the server 502 may use context sensitive awareness in order to discover and store the proper access protocol for the network device 504.

After establishing connection 506, the server 502 performs authentication 508 with network device 504. In an embodiment, this includes entering a user name and password, for example as shown in the CLI 202 or CLI 302 of FIGS. 2 and 3. In a further embodiment, authentication 508 may also include an enable password phase, such as where the network device 504 requires it.

After logging into the network device 504, the server 502 performs unknown session prompt determination 510. In an embodiment, this may be performed by the prompt analysis module 410 introduced above. Exemplary methods for performing prompt analysis will be discussed in more detail with respect to subsequent figures below.

Once the unknown session prompt has been determined and a regular expression derived, the server 502 performs unknown error handling determination 512. In an embodiment, this may be performed by the error analysis module 412 discussed above. Exemplary methods for error analysis will be discussed in more detail below.

After the unknown session prompt has been determined and error handling expressions have been recorded, for example in an error handling dictionary, the server 502 may send commands 514 to the network device 504 to collect data from the network device 504. In an embodiment, the commands pertain to data that a network administrator has requested. The server 502 may, upon receiving the data in response to the commands 514, compare the received data to one or more error messages stored in the error handling dictionary previously constructed and filter out any data that matches error messages in the dictionary.

Once the commands have been sent and the data collected, the server 502 may send a disconnect command 516 and end the session 500.

Figure 6:
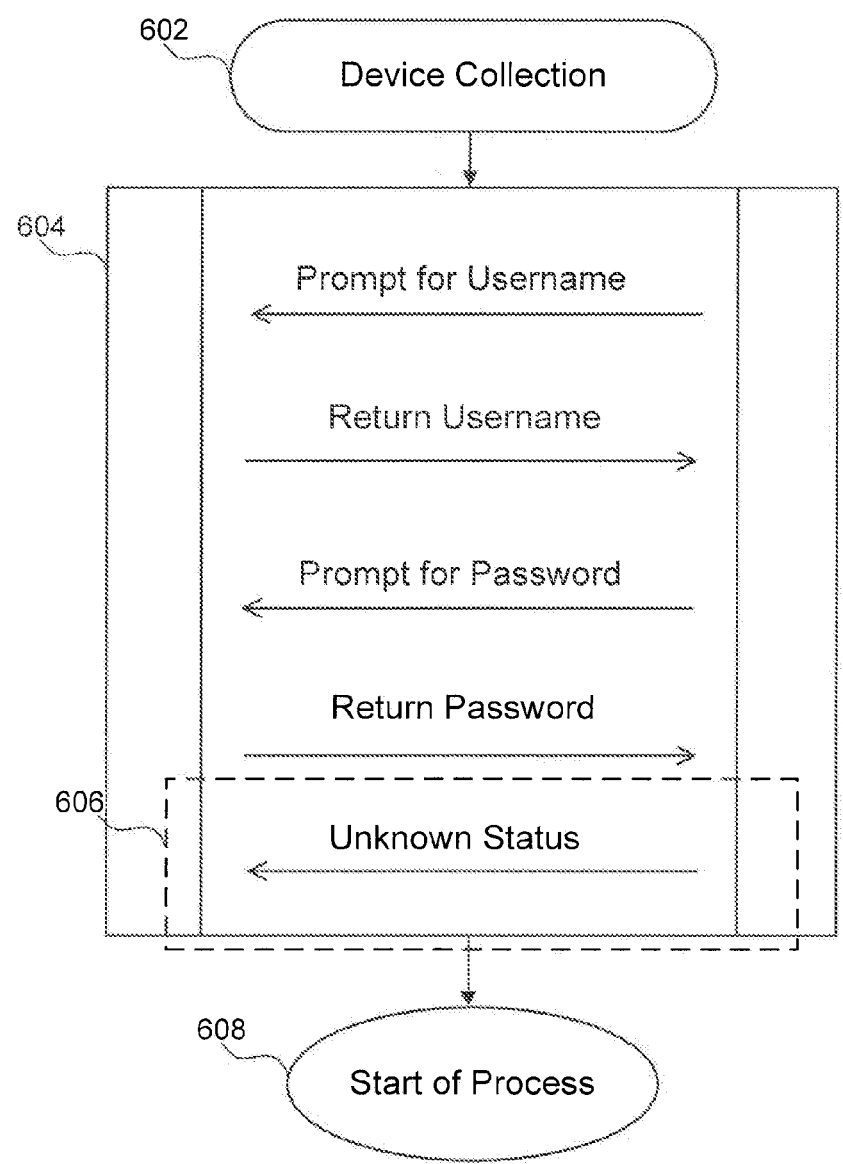
FIG. 6 illustrates an exemplary command prompt flow according to an embodiment.

FIG. 6 illustrates an exemplary command prompt flow 600 according to an embodiment. The flow 600 begins with device collection 602, such as the establishing of a connection 506 discussed above with respect to FIG. 5.

The flow 600 proceeds to authentication flow 604, such as discussed above with respect to authentication 508 in FIG. 5. The authentication flow 604 may include a prompt for a username sent from the network device 504 to the server 502, for example in a CLI. The server 502 may return a user name entered in the CLI to the network device 504. The network device 504 may then prompt the server 502 via the CLI for a password corresponding to the user name previously entered. The server 502 may then send the requested password to the network device 504.

Once the server 502 has been authenticated by the authentication flow 604, the network device 504 returns a state which appears to the server 502 as an unknown status 606. At this point, a human user would be able to recognize that authentication has completed and that the device is ready for input is by visually perceiving a prompt and verifying what it looks like. Previous software attempts have looked for predefined or reserved words or characters, such as the word password or the characters # or >, to help in determining the state. Without a user looking at a comand prompt window, there is no way to know that the network device 504 is ready for commands to be sent. Also, where the network device type is unknown, previous software attempts have had no way of determining the session prompt because there have not been any reserved words or characters representing a proper prompt construction for the unknown network device.

At this unknown status 606, the flow 600 proceeds to start the process 608 of determining the session prompt and deriving a regular expression for the session prompt.

Example Methods

Figure 7:
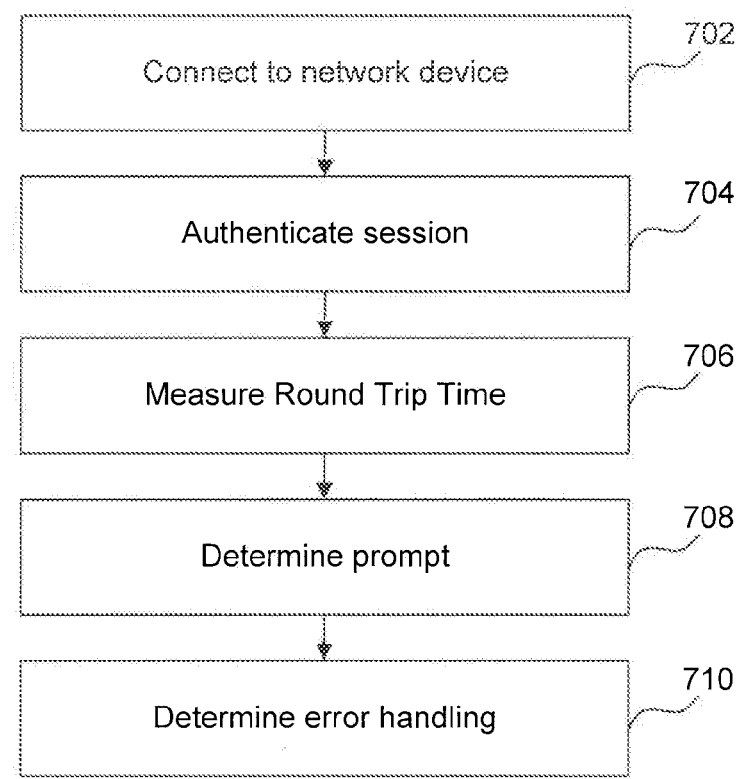
FIG. 7 illustrates an exemplary process for automatic prompt detection according to an embodiment.

FIG. 7 illustrates an exemplary process 700 for automatic prompt detection according to an embodiment. Process 700 provides a high-level view of an exemplary embodiment which will be discussed in more detail in subsequent figures. Although the exemplary process 700 may be performed on any number and type of computing devices, the following figures will be described with respect to the server 400 of FIG. 4, by way of a nonlimiting example.

At step 702, the server 400 connects to the network device, such as network device 504. In an embodiment, the server 400 connects to the network device 504 via the transceiver 404.

At step 704, the server 400 authenticates against the network device 504 (otherwise referred to as logging in to the networking device 504) to be able to communicate with and manage the network device 504, for example as discussed above with respect to FIGS. 5 and 6.

After the server 400 has logged in to the networking device 504, the server 400 measures a round trip time (RTT) for a packet between the server 400 and the networking device 504 at step 706. In an embodiment, this may take the form of a ping packet sent from the server 400. The ping packet may be set to have the largest payload possible in order to simulate a worst-case scenario of large data responses to commands sent to the network device later during a session.

Once the server 400 has collected the measured RTT, the server 400 may use the RTT, or a multiple of it, as a dynamic timeout period. After sending a command, the server 400 waits for the timeout period for a response from the network device 504. In an embodiment, the server 400 may have an arbitrary amount set as the timeout period, for example 60 seconds. This may unnecessarily prolong a waiting period, however. By dynamically adjusting the timeout period based on the RTT, embodiments of the present disclosure may significantly reduce the amount of time used to wait for a response from the network device 504, while still providing sufficient time for a delayed response to arrive. This can be evaluated and re-computed after each conversation so that the RTT can reflect the current state of the network device 504.

For example, the server 400 may take the measured RTT and set the timeout period as the RTT times a multiplier value, such as a rational number or a whole number. The timeout period may be set by a first communication session and used in subsequent communication sessions, or alternatively may be dynamically set at the start phase of each communication session established by the server 400, for example after each conversation.

Returning to process 700, at step 708 the server 400 determines the session prompt for the network device 504. This may include recording the prompt after successful login, after sending a carriage return, and after sending a specific character that likely has no meaning to the network device 504. The server 400 may compare these different recorded prompts against each other and, if there are differences between any of the prompts, determine that the session prompt is a dynamic prompt. If there are no differences between any of the prompts, then the server 400 may determine that the session prompt is a static prompt. In an embodiment, the server 400 waits for the timeout period determined at step 706 after each carriage return and command is sent to the network device 504.

At step 710, the server 400 determines error handling for the network device 504. For example, the error analysis module 412 may send one or more special characters that likely have no meaning to the network device and record the error responses. The error analysis module 412 may construct an error handling dictionary based on the responses for use during subsequent operations.

After step 710 is complete, the server 400 may send commands to network device 504 and collect data responsive to the commands from the network device 504. After all requested commands have been sent and responses recorded, the server 400 may end the process 700, for example by disconnecting from the network device 504.

Figure 8:
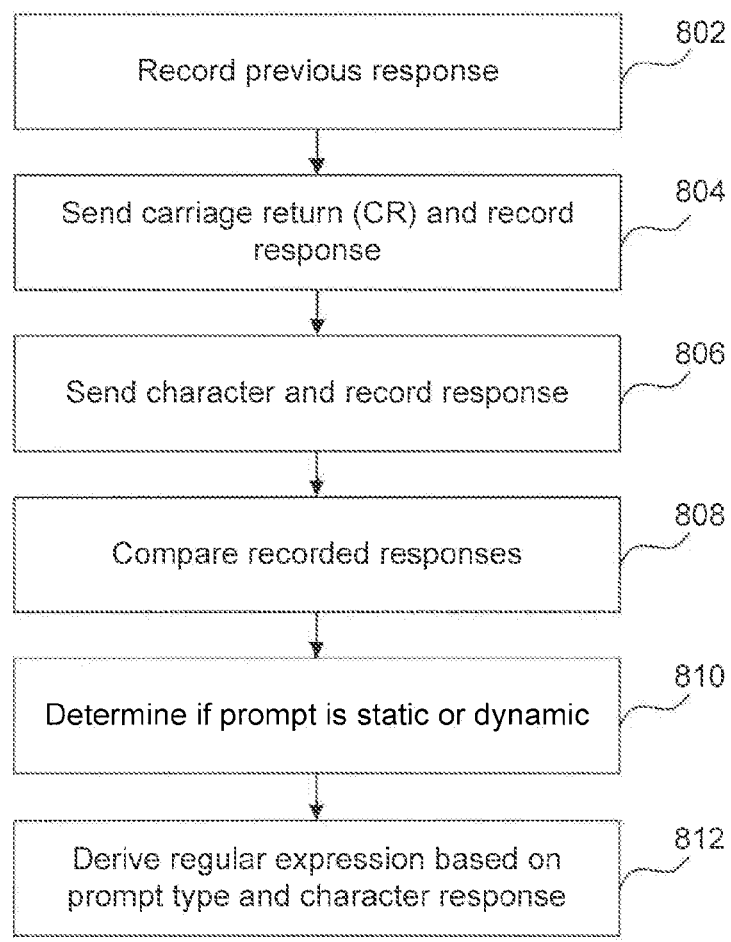
FIG. 8 illustrates an exemplary process for determining a session prompt according to an embodiment.

FIG. 8 illustrates an exemplary process 800 for determining a session prompt according to an embodiment. In an embodiment, process 800 begins at the end of an authentication process, for example after the network device 504 returns the unknown status 606 discussed above with respect to FIG. 6.

At step 802, the server 400 records the previous response, for example the returned unknown status 606 of FIG. 6. In an embodiment, the previous response is a first session prompt 206 of FIG. 2 (static prompt) or a first session prompt 306 of FIG. 3 (dynamic prompt) that the network device 504 returns to the CLI after successful authentication.

At step 804, the server 400, for example by way of the prompt analysis module 410, sends a carriage return to the network device 504 and records the response from the network device 504. In an embodiment, the response is a second session prompt 210 of FIG. 2 or second session prompt 308 of FIG. 3.

At step 806, the prompt analysis module 410 sends a special character that likely is not an actual command to the network device 504, typically followed by a carriage return, and records the response from the network device 504. In an embodiment, the response includes an error message, such as error message 208 of FIG. 2 or error message 310 of FIG. 3, and another session prompt, such as third session prompt 312 of FIG. 3.

At step 808, the prompt analysis module 410 compares the different recorded responses. In an embodiment, the prompt analysis module 410 searches for any differences between the different session prompts recorded.

At step 810, the prompt analysis module 410 takes the results of the comparison and determines whether the session prompt is a static prompt or a dynamic prompt. For example, if the results of the comparisons indicate that there are no differences in any characters of the recorded session prompts, then the prompt analysis module 410 determines that the session prompt is a static prompt. If the results of the comparisons indicates that there is a difference between any one or more of the recorded session prompts, then the prompt analysis module 410 determines that the session prompt is a dynamic prompt.

At step 812, the prompt analysis module 410 derives a regular expression based on the determined prompt type and the characters included in the different responses previously recorded from the network device 504. For example, for the dynamic prompt 300, the derived regular expression would be:

*CARY-EX-ACC01:\d+#

Where "\d+" represents the value that changes in successive prompts after a command has been sent to the network device 504. In the static prompt 200 example, the regular expression would be:

P1#

After deriving the regular expression, process 800 ends.

Figure 9:
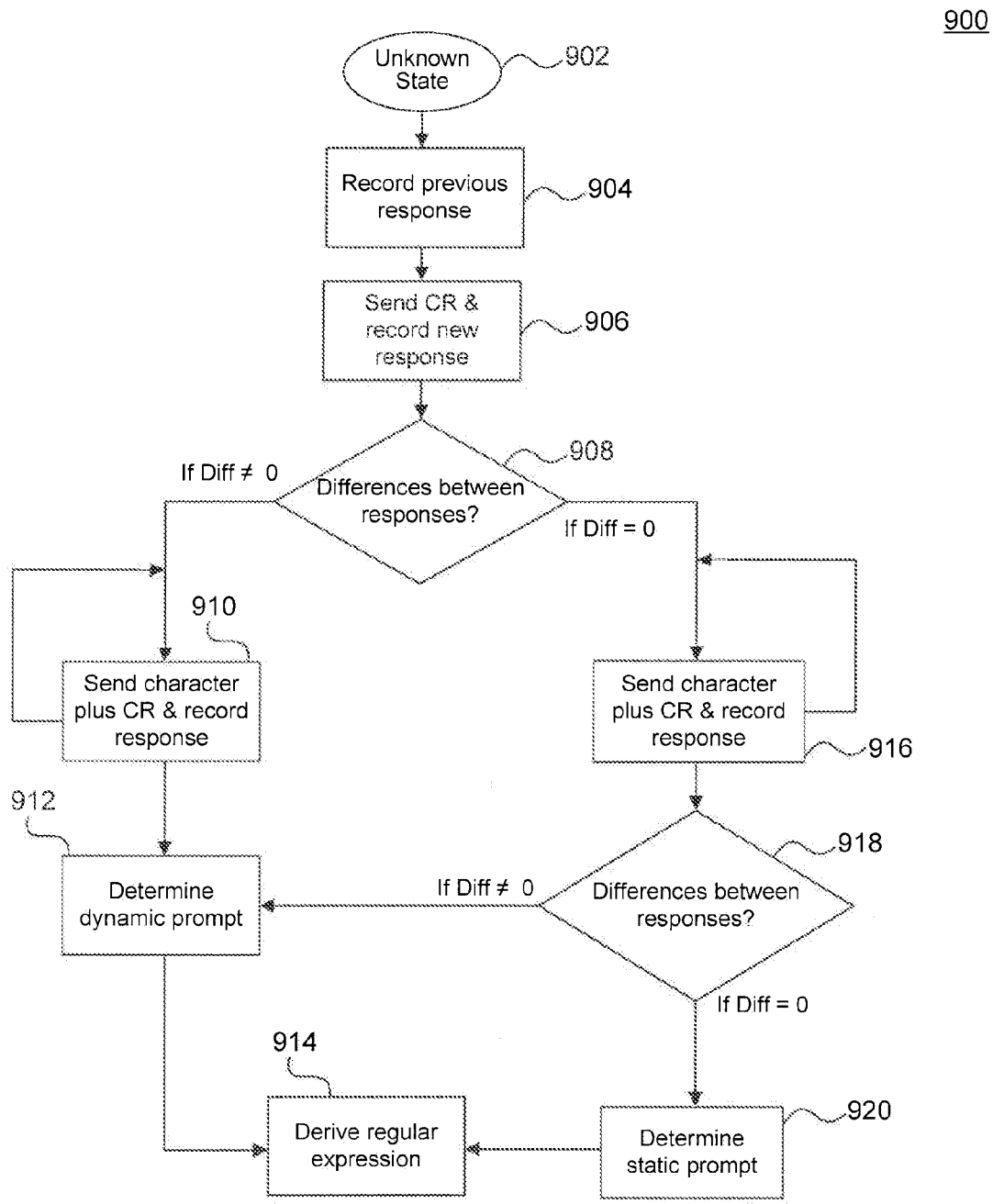
FIG. 9 illustrates an exemplary process for determining a session prompt according to an embodiment.

FIG. 9 illustrates an exemplary process 900 for determining a session prompt according to an embodiment. The process 900 will be described with reference to the prompt analysis module 410 of server 400.

The process 900 begins at the unknown state at step 902, for example the unknown status 606 which the network device 504 returns as discussed above with respect to FIG. 6.

At step 904, the prompt analysis module 410 records the previous response, for example the returned unknown status 606 of FIG. 6. This may be the first session prompt 206 of FIG. 2 or the first session prompt 306 of FIG. 3.

At step 906, the prompt analysis module 410 sends a carriage return to the network device 504 and records the response from the network device 504, such as the second session prompt 210 of FIG. 2 or second session prompt 308 of FIG. 3.

At step 908, the prompt analysis module 410 compares the recorded responses from steps 904 and 906 and determines if there are any differences between them. For example, the prompt analysis module 410 compares the first and second session prompts recorded to determine whether there are any differences between the characters appearing in each of the recorded session prompts.

If there is a difference between the recorded responses, the process 900 proceeds to step 910. At step 910, the prompt analysis module 410 sends a special character followed by a carriage return to the network device 504 and records the response, such as the third session prompt 312 of FIG. 3. In an embodiment, the special character is a character that is not likely to be an actual command to the network device, for example a period character. The process 900 may repeat step 910 one or more times so that a sequence of characters may be sent by the prompt analysis module 410 and a plurality of responses received and recorded. The number of times the step 910 is repeated may be arbitrarily set beforehand, or may be dynamically based on the vendor type of the network device 504 when the vendor type is known.

At step 912, the prompt analysis module 410 determines that the session prompt is a dynamic prompt because of one or more differences existing between the recorded responses.

At step 914, the prompt analysis module 410 derives a regular expression based on the determined prompt type and the different responses previously recorded from the network device 504. Some examples of a derived regular expression are given above with respect to FIG. 8. In an embodiment, after the dynamic prompt is determined the prompt analysis module 410 compares the recorded responses to determine what characters are different between the recorded session prompts. In an embodiment, the prompt analysis module 410 analyzes the differences between the recorded responses (e.g., the session prompts) from steps 904, 906, and 910 to also determine any patterns between changing characters, for example whether the changing character (or characters) is a value that increments by some predetermined amount each time. This may be repeated any number of times until prompt analysis module 410 is satisfied that a pattern of change has been detected. Alternatively, the prompt analysis module 410 does not analyze the pattern of change but rather focuses on identifying the characters that do not change between session prompts.

If at step 908 it is determined that there is no difference between the recorded responses, the process 900 proceeds to step 916. At step 916, the prompt analysis module 410 sends a special character followed by a carriage return to the network device 504 and records the response, such as the third session prompt 312 of FIG. 3. In an embodiment, the special character is a character that not likely to be an actual command to the network device, for example a period character. The process 900 may repeat step 916 one or more times so that a sequence of characters may be sent by the prompt analysis module 410 and a plurality of responses received and recorded. The number of times the step 916 is repeated may be arbitrarily set beforehand, or may be dynamically based on the vendor type of the network device 504 when the vendor type is known.

At step 918, the prompt analysis module 410 compares the recorded responses from steps 906 and 916 (or, alternatively, steps 904, 906, and 916) and determines if there are any differences between them. For example, the prompt analysis module 410 compares the second and third session prompts recorded to determine whether there are any differences between the characters appearing in each of the recorded session prompts.

If there is a difference between the recorded session prompts, the process 900 proceeds to step 912, determines that the session prompt is a dynamic prompt because of the difference, and continues as discussed above with respect to the dynamic prompt.

If there remains no difference at step 918 between the second and third session prompts, then the process 900 proceeds to step 920.

At step 920, the prompt analysis module 410 determines that the session prompt is a static prompt because of the lack of any difference between any of the multiple recorded responses.

The process 900 then proceeds to step 914 to derive a regular expression for the static prompt, which will include all of the characters recorded from the recorded responses.

Figure 10:
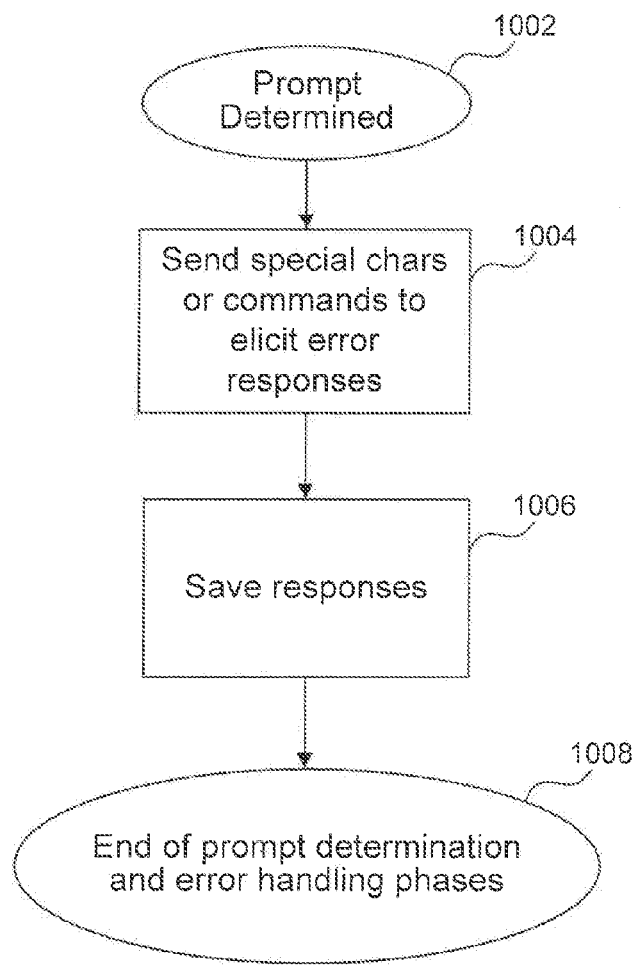
FIG. 10 illustrates an exemplary process for error handling according to an embodiment.

FIG. 10 illustrates an exemplary process 1000 for error handling according to an embodiment. In an embodiment, the error analysis module 412 may perform the steps of process 1000.

At step 1002, the prompt analysis module 410 completes determination of the prompt and derivation of the regular expression, as discussed above with respect to FIGS. 8 and 9.

At step 1004, the error analysis module 412 sends a special character, or a series of special characters, to the network device 504 followed by a carriage return.

At step 1006, the error analysis module 412 saves the error response that the network device 504 outputs. In an embodiment, the error analysis module 412 may store the error response in a memory, such as storage device 406, or some other persistent storage, to construct an error handling dictionary. In an embodiment, the error handling dictionary may be implemented as a database.

The error analysis module 412 may perform steps 1004 and 1006 once, or may repeat the process any number of times in order to elicit as many different error responses possible from the network device 504. In this manner, the error analysis module 412 may assist in determining how the network device 504 behaves when the network device 504 encounters commands that the network device 504 does not understand.

At step 1008, the process 1000 ends. With the construction of an error handling dictionary, the server 400 may reference collected data from the network device 504 to one or more entries in the error handling dictionary to assist in determining whether the responses are error messages or actual data.

Example Computer System

Computer system 1100 includes one or more processors, such as processor 1104. Processor 1104 can be a special purpose or a general purpose digital signal processor. Processor 1104 is connected to a communication infrastructure 1102

(for example, a bus or network). Various software implementations are described in terms of this exemplary computer system. After reading this description, it will become apparent to a person skilled in the relevant art(s) how to implement the disclosure using other computer systems and/or computer architectures.

Computer system 1100 also includes a main memory 1106, preferably random access memory (RAM), and may also include a secondary memory 1108. Secondary memory 1108 may include, for example, a hard disk drive 1110 and/or a removable storage drive 1112, representing a floppy disk drive, a magnetic tape drive, an optical disk drive, or the like. Removable storage drive 1112 reads from and/or writes to a removable storage unit 1116 in a well-known manner. Removable storage unit 1116 represents a floppy disk, magnetic tape, optical disk, or the like, which is read by and written to by removable storage drive 1112. As will be appreciated by persons skilled in the relevant art(s), removable storage unit 1116 includes a computer usable storage medium having stored therein computer software and/or data.

In alternative implementations, secondary memory 1108 may include other similar means for allowing computer programs or other instructions to be loaded into computer system 1100. Such means may include, for example, a removable storage unit 1118 and an interface 1114. Examples of such means may include a program cartridge and cartridge interface (such as that found in video game devices), a removable memory chip (such as an EPROM, or PROM) and associated socket, a thumb drive and USB port, and other removable storage units 1118 and interfaces 1114 which allow software and data to be transferred from removable storage unit 1118 to computer system 1100.

Computer system 1100 may also include a communications interface 1120. Communications interface 1120 allows software and data to be transferred between computer system 1100 and external devices. Examples of communications interface 1120 may include a modem, a network interface (such as an Ethernet card), a communications port, a PCM-CIA slot and card, etc. Software and data transferred via communications interface 1120 are in the form of signals which may be electronic, electromagnetic, optical, or other signals capable of being received by communications interface 1120. These signals are provided to communications interface 1120 via a communications path 1122. Communications path 1122 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1116 and 1118 or a hard disk installed in hard disk drive 1110. These computer program products are means for providing software to computer system 1100.

Computer programs (also called computer control logic) are stored in main memory 1106 and/or secondary memory 1108. Computer programs may also be received via communications interface 1120. Such computer programs, when executed, enable the computer system 1100 to implement the present disclosure as discussed herein. In particular, the computer programs, when executed, enable processor 1104 to implement the processes of the present disclosure, such as any of the methods described herein. Accordingly, such computer programs represent controllers of the computer system 1100. Where the disclosure is implemented using software, the software may be stored in a computer program product and loaded into computer system 1100 using removable storage drive 1112, interface 1114, or communications interface 1120.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

Embodiments have been described above with the aid of functional building blocks illustrating the implementation of specified functions and relationships thereof The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method for automatically detecting a prompt with a network device, comprising:
    recording, at a server, a first prompt response received from the network device in response to logging in to the network device;
    sending a first command to the network device and recording a second prompt response received from the network device in response to the first command;
    sending a second command to the network device and recording a third prompt response received from the network device in response to the second command;
    comparing the first prompt response, the second prompt response, and the third prompt response to each other; and
    determining the prompt to be a static prompt in response to the comparing resulting in no differences between the first, second, and third prompt responses and a dynamic prompt in response to the comparing resulting in a difference between the first, second, and third prompt responses.

2. The method of claim 1, further comprising:
    determining a number of matching characters between the first prompt response, the second prompt response, and the third prompt response based on the comparing; and
    deriving a regular expression based on the determined prompt and the determined number of matching characters.

3. The method of claim 1, wherein:
the first command comprises a carriage return; and
the second command comprises a character.

4. The method of claim 1, further comprising:
measuring a round trip time (RTT) for a timing command between the server and the network device; and
assigning a time-out period for responses from the network device as the RTT times a multiplier factor.

5. The method of claim 4, wherein the timing command comprises a ping packet, the method further comprising:
setting the ping packet to a maximum allowable size to simulate a worst case scenario for a response from the network device.

6. The method of claim 1, further comprising:
sending a special character to the networking device to elicit an error response from the networking device, wherein the special character comprises a character predicted to have no known use for the networking device;
recording the error response from the networking device; and
generating a custom error dictionary based on the recorded error response.

7. The method of claim 6, further comprising:
sending a user-specified command to the networking device;
receiving a specific response to the user-specified command from the networking device;
comparing the specific response to an entry in the custom error dictionary; and
determining success or failure of execution of the user-specified command based on a result of the comparing to the entry in the custom error dictionary.

8. A server for automatically detecting a prompt with a network device, comprising:
a transceiver configured to transmit and receive messages to and from the network device;
a prompt analysis module configured to:
record a first prompt response received from the network device in response to logging in to the network device;
send a first command to the network device and record a second prompt response received from the network device in response to the first command;
send a second command to the network device and record a third prompt response received from the network device in response to the second command;
compare the first prompt response, the second prompt response, and the third prompt response to each other; and
determine the prompt to be a static prompt in response to the comparison resulting in no differences between the first, second, and third prompt responses and a dynamic prompt in response to the comparison resulting in a difference between the first, second, and third prompt responses; and
a processor configured to execute the prompt analysis module.

9. The server of claim 8, wherein:
the first command comprises a carriage return; and
the second command comprises a character.

10. The server of claim 8, wherein the prompt analysis module is further configured to:
measure a round trip time (RTT) for a timing command between the server and the network device; and
assign a time-out period for responses from the network device as the RTT times a multiplier factor.

11. The server of claim 10, wherein:
the timing command comprises a ping packet to measure the RTT; and
the ping packet is set to a maximum allowable size to simulate a worst case scenario for a response from the network device.

12. The server of claim 8, further comprising:
an error analysis module configured to:
send a special character to the networking device to elicit an error response from the networking device, wherein the special character comprises a character predicted to have no known use for the networking device;
record the error response from the networking device; and
generate a custom error dictionary based on the recorded error response;
wherein the processor is further configured to execute the error analysis module.

13. The server of claim 12, wherein the error-analysis module is further configured to:
send a user-specified command to the networking device;
receive a specific response to the user-specified command from the networking device;
compare the specific response to an entry in the custom error dictionary; and
determine success or failure of execution of the user-specified command based on a result of the comparison to the entry in the custom error dictionary.

14. A non-transitory computer-readable storage medium having control logic recorded thereon that, when executed by a processor, causes the processor to perform a method for detecting a prompt with a network device, the method comprising:
recording a first prompt response received from the network device in response to logging in to the network device;
sending a first command to the network device and recording a second prompt response received from the network device in response to the first command;
sending a second command to the network device and recording a third prompt response received from the network device in response to the second command;
comparing the first prompt response, the second prompt response, and the third prompt response to each other; and
determining the prompt to be a static prompt in response to the comparing resulting in no differences between the first, second, and third prompt responses and a dynamic prompt in response to the comparing resulting in a difference between the first, second, and third prompt responses.

15. The non-transitory computer-readable storage medium of claim 14, further comprising:
determining a number of matching characters between the first prompt response, the second prompt response, and the third prompt response based on the comparing; and
deriving a regular expression based on the determined prompt and the determined number of matching characters.

16. The non-transitory computer-readable storage medium of claim 14, wherein:
the first command comprises a carriage return; and
the second command comprises a character.

17. The non-transitory computer-readable storage medium of claim 14, further comprising:

measuring a round trip time (RTT) for a timing command between the server and the network device; and assigning a time-out period for responses from the network device as the RTT times a multiplier factor.

18. The non-transitory computer-readable storage medium of claim 17, wherein the timing command comprises a ping packet, the method further comprising:

setting the ping packet to a maximum size to simulate a worst case scenario for a response from the network device.

19. The non-transitory computer-readable storage medium of claim 14, further comprising:

sending a special character to the networking device to elicit an error response from the networking device, wherein the special character comprises a character predicted to have no known use for the networking device;

recording the error response from the networking device; and generating a custom error dictionary based on the recorded error response.

20. The non-transitory computer-readable storage medium of claim 19, further comprising:

sending a user-specified command to the networking device;

receiving a specific response to the user-specified command from the networking device;

comparing the specific response to an entry in the custom error dictionary; and determining success or failure of execution of the user-specified command based on a result of the comparing to the entry in the custom error dictionary.

\* \* \* \* \*